Figure 1:
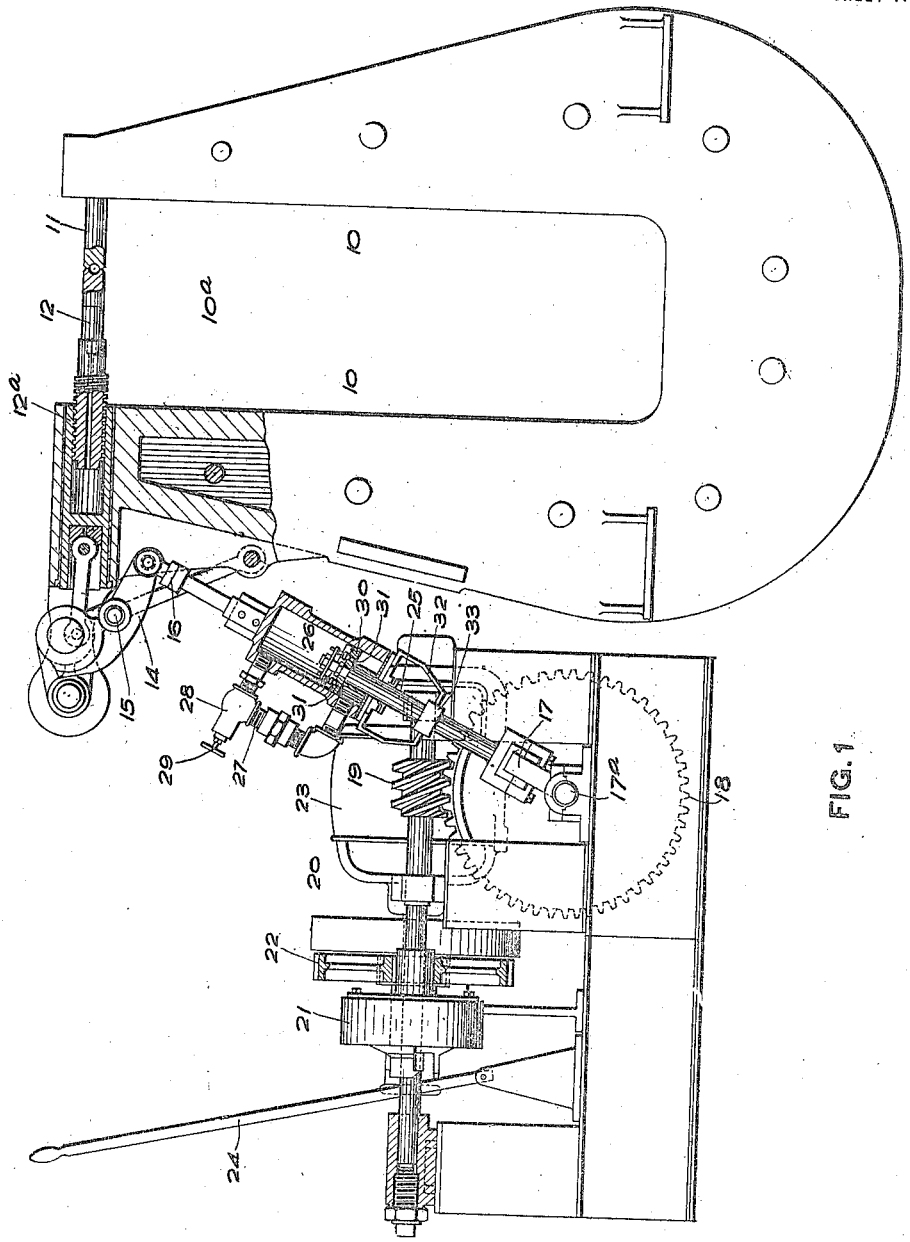

C. J. WALKER.
RIVETER.
APPLICATION FILED JUNE 22, 1915.

1,180,626.

Patented Apr. 25, 1916.
2 SHEETS—SHEET 2.

WITNESSES
Chas. Footerman
R D Little

INVENTOR
C. J. Walker
by C. C. Linthicum
his Attorney

UNITED STATES PATENT OFFICE.

CHARLES J. WALKER, OF GARY, INDIANA.

RIVETER.

1,180,626.  Specification of Letters Patent.  Patented Apr. 25, 1916.

Original application filed July 31, 1913, Serial No. 782,371. Divided and this application filed June 22, 1915. Serial No. 35,733.

*To all whom it may concern:*

Be it known that I, CHARLES J. WALKER, a citizen of the United States, and resident of Gary, in the county of Lake and State of Indiana, have invented certain new and useful Improvements in Riveters, of which the following is a specification.

My invention relates to power apparatus used in upsetting rivet heads in fastening built-up members together by means of rivets, and known as riveters, and this application is a division of my co-pending application Serial No. 782,371, filed July 31, 1913.

Power operated riveters as constructed heretofore have usually employed a fluid pressure cylinder and piston, either applied directly or through suitable lever mechanism to the rivet snaps in actuating the rivet snaps. In such apparatus air, steam, and similar elastic fluids, and also water, a non-elastic fluid, have been employed in the cylinders as the piston actuating medium.

It is evident that the cheapest and most efficient and satisfactory riveter construction is one having a mechanically or electrically operated driving element, such as a crank shaft, from which the power could be applied through a suitable lever mechanism to the rivet snaps. The disadvantages of this type of machine, and the reason why such machines are not in general use, lie in the lack of flexibility and frequent breakage of parts resulting therefrom without the provision of means to take care of pressure in excess of a pre-determined maximum.

One object of my invention is to provide a mechanically actuated riveter having novel means whereby the rivet snaps are caused to approach with a constant maximum pressure and with a stroke or approaching movement which varies with irregularities in the length of the successive rivets, in the thickness of the materials being riveted, and other inequalities in the materials being operated upon.

Another object of the invention is to provide a power riveter having the novel combination and arrangement of parts shown and described, and still further objects of the invention will be specifically pointed out in the appended claims.

Such means are provided in accordance with my invention by introducing a fluid control between the prime mover and the rivet snaps. This fluid control is so arranged in connection with a relief valve that the same degree of pressure will always be applied in forming the rivet heads whether the rivets vary in length or the work varies in thickness, the desired maximum pressure being readily attained even with changes in the stroke or extent of relative movement of the rivet snaps by controlling the operation of the relief valve.

In the embodiment of my invention shown in the drawings the fluid control is located on the pitman connecting the power driven crank with the lever mechanism controlling the application of power to the rivet snaps.

The invention will be more readily understood by reference to the drawings forming part of this specification, wherein—

Figure 2:
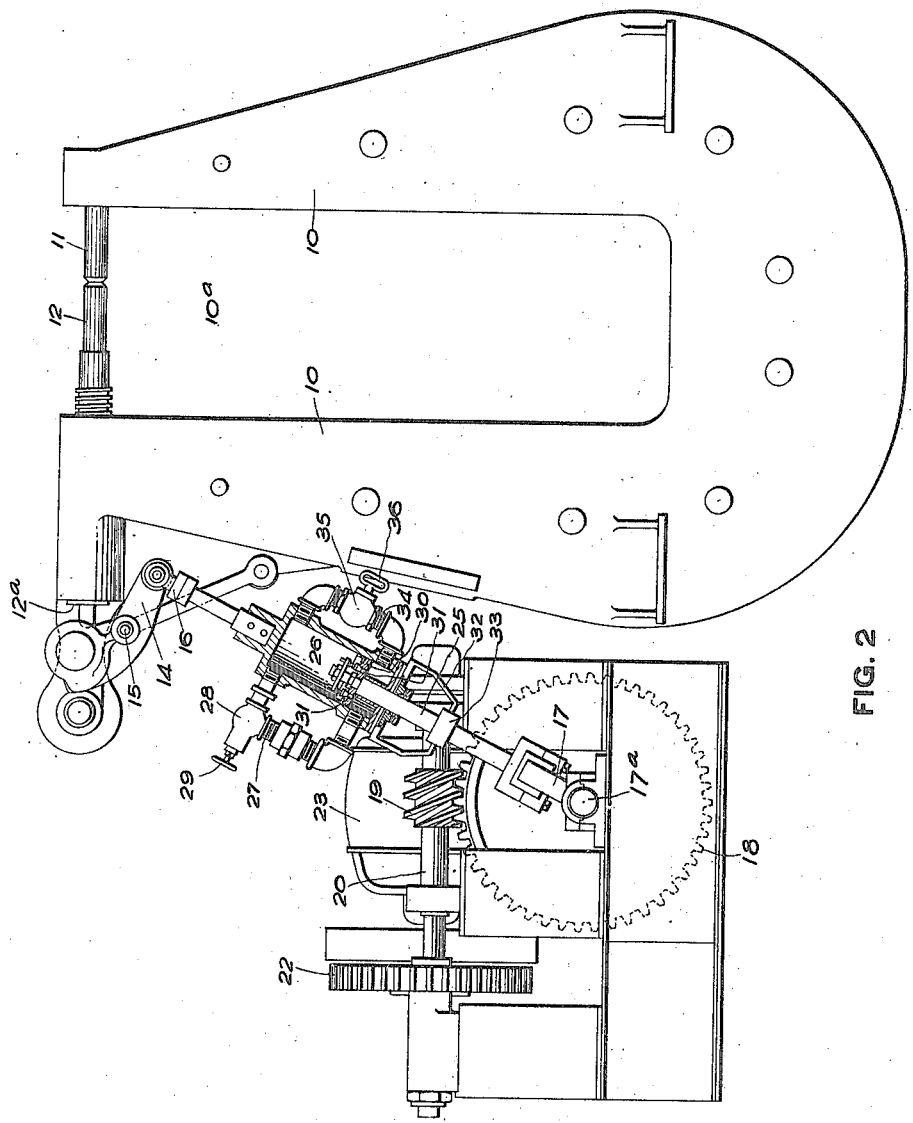

Figure 1 is a side elevation partly in section, of riveting apparatus with my novel pressure control applied thereto, and Fig. 2 is a similar view showing a modified construction.

Referring now more particularly to the accompanying drawings, it will be seen that my device, as applied to a riveter, consists in the usual jaws 10, 10, forming a throat in which are mounted a stationary rivet snap 11 and a reciprocating rivet snap 12. The rivet snap 12 is secured in a snap holder $12^a$ so as to be lengthwise adjustable, and the holder $12^a$ is connected by a suitable toggle mechanism to a lever 14 fulcrumed at 15 on the jaw frame. The lever 14 is pivotally connected to the upper end 16 of the pitman which transmits power to the rivet snaps 12 from the crank 17 of the crank shaft $17^a$. Secured on the shaft $17^a$ to rotate therewith, is a worm gear 18 which is rotated by means of the worm 19 on the shaft 20, and the shaft 20 is connected, through a friction clutch 21 and reducing gearing 22, to a motor 23, or other prime mover.

A manually operated lever 24 is employed to throw the friction clutch 21 into and out of clutching position. My novel fluid control is installed in the pitman between the upper end 16 and the lower end thereof, and as shown consists of a cylinder 26 rigidly secured to the upper end 16, this cylinder being provided with a by-pass 27 which is controlled by a relief valve 28, the pressure at which the relief valve is opened being controlled by a valve handle 29.

Secured to the lower end 25 of the pitman is a piston 30 provided with check valves 31 therein, these valves being arranged to permit the passage of a liquid to the front of the cylinder 26 and prevent the passage in a reverse direction. The cylinder is held in suitable relation to the lower end of the pitman 25 by means of a yoke 32, carrying a bearing 33 therein, through which the lower portion 25 of the pitman operates. Any suitable fluid, but preferably oil, is employed in the cylinder 26.

The operation of my device is as follows: The work to be riveted is placed in the throat of the riveter with the rivet holes in which the rivet is to be driven in alinement with the rivet snaps 11 and 12, and the motor 23 is started in operation. A heated rivet is then inserted in the proper hole in the work being riveted. The workman, through the lever 24 throws the clutch 21 into clutching engagement, thus imparting movement to the worm gear 18 and causing rotation thereof with the crank 17. Rotation of the crank 17 advances the pitman and applies pressure to the liquid within the cylinder 26. As rotation of the crank continues and the rivet snaps are brought into engagement with the rivet being upset, the pressure exerted is transmitted to the liquid within the cylinder, and when the pressure reaches a predetermined point the relief valve will open and permit liquid to pass through the relief valve 28 and by-pass 27, to the rear side of the piston 30. After the crank 17 passes the dead center the piston 30 will be returned and any liquid on the rear side of the piston will escape to the front side thereof through the valves 31 in the piston 30. By adjusting the relief valve through the medium of the handle 29 the exact amount of pressure applied to the rivet snaps may be controlled and the travel or stroke of the reciprocating rivet snap varied without change in the maximum pressure exerted on the rivet snaps. When desired, a gage is placed on the cylinder 26 to determine the amount of pressure being exerted, and if desired this gage may be calibrated to show tons pressure applied to the rivet snaps.

In the modification shown in Fig. 2, the parts are the same as heretofore described, except in that no friction clutch is employed, the parts being operated continuously. However, in order to prevent reciprocating movement of the rivet snaps except as required, a second by-pass 34 is installed between the front and rear of the piston, and a throttle valve 35, controlled by a handle 36, is placed in the by-pass 34. When the machine is running idly the throttle valve 35 will be open and liquid will freely pass from the front to the rear side of the piston 30 without causing reciprocating movement of the rivet-snaps.

As soon, however, as a rivet is to be driven, the throttle valve 35 is closed and the operation is then the same as has been described in connection with the construction shown in Fig. 1.

Obviously modifications may be made in the exact construction of the parts, as well as in the location of the liquid controlling device without departing from the spirit of my invention as defined in the appended claims.

I claim:—

1. A riveter comprising opposite jaws having a throat therebetween, a fixed rivet snap on one jaw, a reciprocatory rivet snap on the opposite jaw, a lever mechanism for actuating the reciprocatory rivet snap, a driving motor having a crank shaft operatively connected thereto, and a pitman connecting the crank shaft and the lever mechanism, said pitman having yielding means whereby a predetermined pressure is transmitted from the motor to said reciprocatory rivet snap.

2. A riveter comprising opposite jaws having a throat therebetween, a fixed rivet snap on one jaw, a reciprocatory rivet snap on the opposite jaw, a lever mechanism for actuating the reciprocatory rivet snap, a driving motor having a crank shaft operatively connected thereto, a pitman connecting the crank shaft and the lever mechanism, said pitman having yielding means whereby a predetermined pressure is transmitted from the motor to said reciprocatory rivet snap, and means on said pitman for varying said predetermined pressure.

3. A riveter comprising opposite jaws having a throat therebetween, a fixed rivet snap on one jaw, a reciprocatory rivet snap on the opposite jaw, a toggle for actuating the reciprocatory rivet snap, a driving motor having a crank operatively connected thereto and a pitman connecting said crank shaft to the toggle, said pitman having collapsible means thereon whereby transmission of pressure exceeding a predetermined maximum is prevented.

4. A riveter comprising opposite jaws having a throat therebetween, a fixed rivet snap on one jaw, a reciprocatory rivet snap on the opposite jaw, a toggle for actuating the reciprocatory rivet snap, a driving motor having a crank operatively connected thereto and a sectional pitman connecting said crank shaft to the toggle, said pitman having an interposed dashpot cylinder connecting the end sections thereof and adapted to permit changes in the length of said pitman when a predetermined maximum pressure is applied thereto.

5. A riveter comprising opposite jaws having a throat therebetween, a fixed rivet snap on one jaw, a reciprocatory rivet snap on the opposite jaw, a toggle for actuating the reciprocatory rivet snap, a driving motor having a crank operatively connected thereto and a sectional pitman connecting said crank shaft to the toggle, said pitman having an interposed dashpot cylinder connecting the end sections thereof and adapted to permit of changes in the length of said pitman when a predetermined maximum pressure is applied thereto, and a by-pass on said dashpot cylinder having an adjustable relief valve thereon whereby changes in said predetermined maximum pressure are effected.

6. A riveter comprising opposite jaws having a throat therebetween, a fixed rivet snap on one jaw, a reciprocatory rivet snap on the opposite jaw, a toggle for actuating the reciprocatory rivet snap, a driving motor having a crank operatively connected thereto and a pitman connecting said crank shaft to the toggle, said pitman being made in sections with a piston on one section and a cylinder on the other section thereof in which said piston is mounted and said cylinder having a by-pass connecting the cylinder on opposite sides of said piston.

7. A riveter comprising opposite jaws having a throat therebetween, a fixed rivet snap on one jaw, a reciprocatory rivet snap on the opposite jaw, a toggle for actuating the reciprocatory rivet snap, a driving motor having a crank operatively connected thereto and a sectional pitman connecting said crank shaft to the toggle, said pitman having an interposed dashpot cylinder connecting the end sections thereof and adapted to permit changes in the length of said pitman with a by-pass on said dashpot cylinder having an adjustable relief valve thereon whereby changes in said predetermined maximum pressure are effected.

8. A riveter comprising opposite jaws having a throat therebetween, a fixed rivet snap on one jaw, a reciprocatory rivet snap on the opposite jaw, a toggle for actuating the reciprocatory rivet snap, a driving motor having a crank operatively connected thereto and a sectional pitman connecting said crank shaft to the toggle, said pitman having an interposed dashpot cylinder connecting the end sections thereof and adapted to permit changes in the length of said pitman when a predetermined maximum pressure is applied thereto, a by-pass on said cylinder having an adjustable relief valve thereon whereby changes in said predetermined maximum pressure are effected, a relief valve in said by-pass and a second relief valve positioned in said piston and arranged to connect said cylinder on opposite sides of said piston.

9. A riveter comprising opposite jaws having a throat therebetween, a fixed rivet snap on one jaw, a reciprocatory rivet snap on the opposite jaw, a toggle for actuating the reciprocatory rivet snap, a driving motor having a crank operatively connected thereto and a sectional pitman connecting said crank shaft to the toggle, said pitman having an interposed dashpot cylinder connecting the end sections thereof and adapted to permit changes in the length of said pitman when a predetermined maximum pressure is applied thereto, and a by-pass on said dashpot cylinder having an adjustable relief valve thereon whereby changes in said predetermined maximum pressure are effected, a relief valve in said by-pass and a second relief valve positioned in said piston and arranged to connect said cylinder on opposite sides of said piston, said second relief valve operating in the opposite direction to said by-pass relief valve.

In testimony whereof I have hereunto set my hand.

CHARLES J. WALKER.

Witnesses:
ROBERT McGHEE,
HARRY GROGHEGAN.

Copies of this patent may be obtained for five cents each, by addressing the "Commissioner of Patents, Washington, D. C."